Oct. 16, 1962 S. S. OSDER 3,058,699
AUTOMATIC APPROACH SYSTEM FOR AIRCRAFT
Filed April 6, 1961
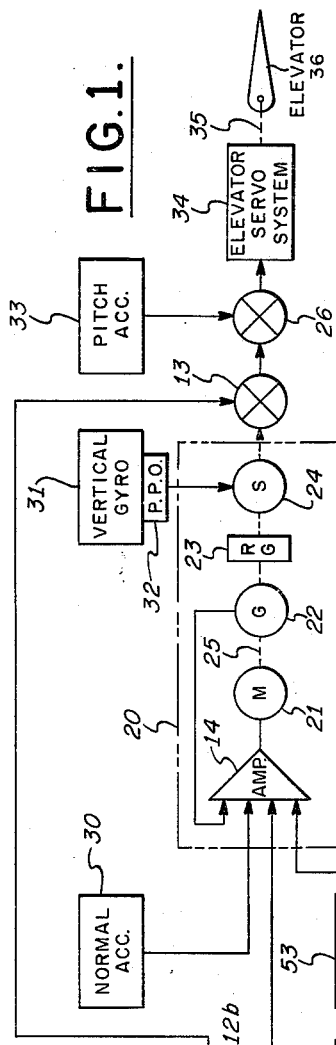
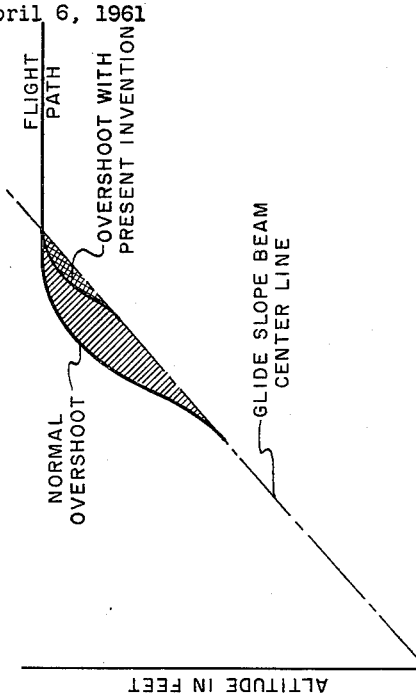
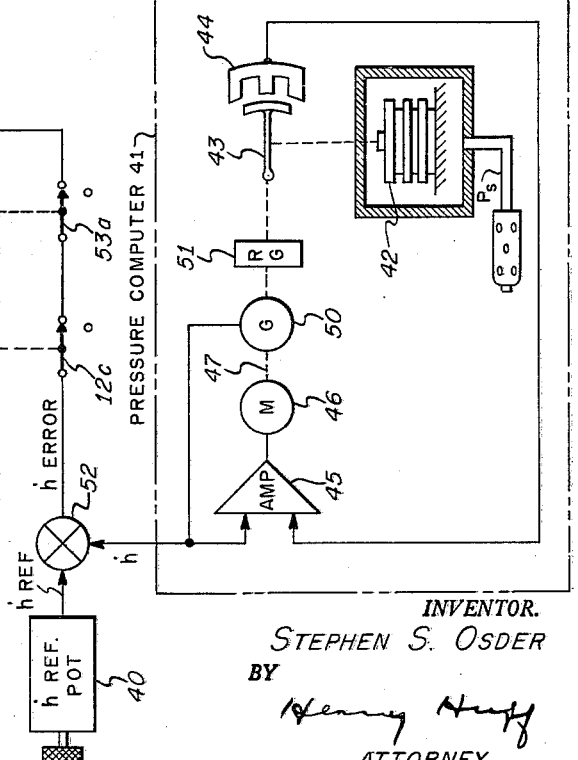
INVENTOR.
STEPHEN S. OSDER
BY
ATTORNEY

United States Patent Office 3,058,699
Patented Oct. 16, 1962

3,058,699
AUTOMATIC APPROACH SYSTEM FOR
AIRCRAFT
Stephen S. Osder, Phoenix, Ariz., assignor to Sperry Rand
Corporation, Great Neck, N.Y., a corporation of Delaware
Filed Apr. 6, 1961, Ser. No. 101,276
10 Claims. (Cl. 244—77)

This invention relates to automatic approach apparatus for aircraft and particularly to apparatus for capturing the center line of a radio defined glide slope beam of an instrument landing system.

In certain prior art automatic pilot systems, for example those of the type disclosed in U.S. application Serial No. 571,813, now U.S. Patent No. 3,007,656, issued November 7, 1961, entitled "Aircraft Automatic Pilots" of H. Miller et al. filed March 15, 1956, when the automatic approach mode is selected, the glide path control configuration is engaged automatically when the center line of the glide path beam is penetrated. The center line of the glide path beam of a conventional instrument landing system (I.L.S.) is disposed at an angle of 2½° with respect to the earth. Therefore, if the aircraft maintained a horizontal flight path prior to penetrating the beam center line, it would have to change its flight path by 2½° in a downward direction to follow the center line of the glide path beam. This necessitates a 2½° pitch down bias to prevent a stand-off error from the center line of the glide slope beam. In the automatic approach system described in the aforementioned application Serial No. 571,813, the 2½° pitch down bias is provided by a signal representative of the integral of the displacement of the aircraft from the center line of the guide slope. This arrangement requires a stand-off error above the beam for a time interval long enough for the integrating device responsive to the glide slope displacement signal to generate the necessary 2½° pitch down signal. Since the gain of the glide path integral signal must be relatively low for reasons of flight path stability, the aforementioned arrangement results in the aircraft standing-off above the beam center for a long period of time, i.e., an undesirable overshoot.

Another prior art solution to this problem is to provide for manual insertion of the necessary 2½° pitch down bias by the human pilot at the time he manually engages the glide path control mode of operation. This is undesirable since it requires careful manipulation by the human pilot at a time when he is occupied with a number of other important matters.

The problem is further aggravated by the fact that it is not always convenient to maintain a horizontal flight path at the time the aircraft approaches the glide slope beam. Under actual flight conditions the center of the glide slope beam may be penetrated from any flight path angle. Thus, merely adding a bias signal representative 2½° of nose-down pitch whenever the glide path is engaged does not solve the problem under all conditions. The present invention automatically provides the correct pitch bias for any aircraft beam penetration angle including intercepting the beam in a dive angle greater than 2½° or in a climb.

A further problem is that the angle which the center line of the glide slope beam makes with the earth may be more or less than 2½°. Several landing systems have recently been suggested in which such is the case. The present invention also includes a provision for adjusting the reference bias signal in accordance with the angle that the center line of the glide slope beam makes with the earth.

It is therefore a primary object of the present invention to provide an automatic approach system for aircraft which captures the center line of the glide slope beam with relatively little overshoot.

It is a further object of the present invention to provide an automatic approach system which automatically captures the center line of a glide slope beam irrespective of the aircraft flight path penetration angle.

It is another object of the present invention to provide an automatic approach system which automatically captures the center line of a glide slope beam irrespective of the angle which the beam makes with the earth.

The above objects are accomplished by controlling the pitch attitude of the aircraft in accordance with a rate of descent error signal which is rendered effective upon the aircraft reaching a predetermined position with respect to the center line of the glide slope beam, for example when the aircraft intercepts the center line, and maintains the error signal effective for a predetermined time interval thereafter. The rate of descent error signal is obtained by comparing a signal representative of a nominal rate of descent defined by the angle of the glide slope beam with respect to the earth and the approach speed of the aircraft with a signal representative of the actual rate of descent of the aircraft. The difference therebetween is the rate of descent error signal which is connected to control the elevator of the aircraft to command a pitch attitude change which will cause the aircraft to capture the center line of the glide slope beam with relatively little overshoot.

Referring now to the drawings:

FIG. 1 is a schematic wiring diagram incorporating the present invention in an automatic approach system;

FIG. 2 is a graph showing typical glide path engage trajectories of an aircraft with and without the present invention; and FIG. 3 is a schematic wiring diagram of an alternative embodiment of a portion of FIG. 1 including for varying the reference signal in accordance with the actual angle of the center line of the beam with respect to the earth.

The present invention will now be described applied to an automatic flight control system as described in the aforementioned patent application Serial No. 571,813 which utilizes a velocity servo system. It will be appreciated that the present invention is equally applicable to flight control systems utilizing displacement servo systems of the type disclosed in U.S. Patent No. 2,636,699 entitled Automatic Pilot for Aircraft issued to G. Jude et al. on April 28, 1953, and the invention is also applicable to flight director systems, for example, of the type disclosed in U.S. Patent No. 2,613,352 entitled Radio Navigation System issued to S. Kellogg 2nd on October 7, 1952.

Referring now to FIG. 1, a radio navigation receiver 10 is tuned to a particular I.L.S. frequency in order to provide a D.C. signal having a magnitude and polarity representative of the magnitude and sense respectively of the displacement of the aircraft with respect to the center line of a particular glide slope beam. In the approach mode of operation when the aircraft intercepts the center line of the radio beam, a null sensor 11 connected to be responsive to the displacement signal from the receiver 10 senses the null condition when the displacement signal is zero or any value representative of a position above the beam center line and actuates a glide path engage relay 12. This causes the relay 12 to engage thereby positioning its contact arms 12a, 12b and 12c to their upper or closed positions as shown.

Thus, in the approach mode of operation, the displacement signal from the receiver 10 is normally connected through the contact arms 12a and 12b of a glide path engage relay 12 to an input terminal of an algebraic summation device 13 and to an input terminal of a summing amplifier 14 respectively. The summing amplifier 14 is a part of an electromechanical integrating device 20. The integrator 20 also includes a servomotor 21 connected to be controlled by the signal from the amplifier 14, a tachometer generator 22, a reduction gearing 23, and a synchro transmitter 24. The output shaft 25 of the servomotor 21 is connected to drive the tachometer generator 22 and the rotor of the synchro transmitter 24, the latter through the reduction gearing 23. The tachometer generator 22 provides a rate feedback signal to an input terminal of the summing amplifier 14 which establishes the basic gain of the electromechanical integrator 20.

A normal accelerometer 30 is mounted in the aircraft to be responsive to vertical accelerations and provides a signal representative thereof for vertical flight path damping purposes to an input terminal of the summing amplifier 14. A vertical gyro 31 is mounted in the aircraft in order that its pitch pick-off 32 provides a signal representative of the deviation of the aircraft from a predetermined pitch attitude which is connected to excite the stator of the synchro transmitter 24 in accordance therewith. The output terminal of the synchro 24 is connected to an input terminal of the algebraic summation device 13 in order that the signal from the synchro 24 is in opposition to the signal appearing on the other input terminal of the device 13. The output terminal of the summation device 13 is connected to an input terminal of another algebraic summation device 26. The latter has its other input terminal connected to be responsive to a signal representative of the angular acceleration around the pitch axis from paired pitch accelerometers 33. The structure and mounting of the paired pitch accelerometers 33 are more fully disclosed in the aforementioned application Serial No. 571,813. The output terminal of the algebraic summation device 26 is connected to an elevator servo system 34 which has its output shaft 35 connected to position the elevator 36 of the aircraft. Preferably, the servo system in the embodiment shown is a velocity type servo system as described in the aforementioned U.S. application Serial No. 571,813.

Utilizing the system described immediately above, the displacement signal representative of the position of the aircraft with respect to the center of the glide slope beam from the radio receiver 10 is applied directly through the contact arm 12a to the elevator servo system 34 by means of the device 13 while the integral of the displacement signal is applied to the elevator servo system 34 through the contact arm 12b and the integrator 20. The combination of displacement and integral of displacement glide slope signals for approaching and maintaining the glide slope beam results in the aircraft standing-off above beam center line for an undesirably long period of time as explained previously. This is shown graphically in FIG. 2 wherein the dash-dot line indicates the glide slope beam center line and the solid line indicates the flight path of an aircraft utilizing the above system. With the aircraft approaching the glide slope beam at a horizontal flight path, the shaded area above the beam center line represents the overshoot of the aircraft, i.e., the time required for the integral signal to become effective to return the aircraft to the glide slope beam center line. This undesirable overshoot is appreciably reduced by means of the present invention in a manner to be explained forthwith.

Referring again to FIG. 1, a reference signal $\dot{h}_{ref}$ is generated in a potentiometer 40 representative of a nominal rate of descent defined by the angle of the center line of the glide slope beam with respect to the earth and the approach speed of the aircraft. Since the approach speed for a particular aircraft will vary very little from one approach to another, a nominal approach speed V can be used with little error. The nominal rate of descent reference signal so generated is a voltage defined by $\dot{h}_{ref} = V \sin 2\frac{1}{2}°$ where the glide slope center line is at a 2½° angle with respect to the earth. The reference signal $\dot{h}_{ref}$ is thus representative of a desired rate of descent which may also be considered as a commanded flight path angle.

A signal representative of the actual rate of descent $\dot{h}$ of the aircraft is obtained from a pressure computer 41 or alternatively from a radio altimeter (not shown) or a combination thereof. The pressure computer 41 may be of the type disclosed in U.S. Patent 2,729,780 entitled Altitude Control For Automatic Pilots of H. Miller et al. issued January 3, 1956. The pressure computer 41 includes an evacuated bellows 42 responsive to static pressure which positions the armature of an E-pick-off 44 against the spring restraint of a torsion bar 43. The output signal of the E-pick-off 44 has an amplitude and phase representative of the magnitude and sense respectively of the armature displacement from a force balance central position.

The pick-off 44 is connected to an input terminal of a summing amplifier 45 which in turn is connected to control a servomotor 46. The output shaft 47 of the servomotor 46 is connected to drive a tachometer generator 50 and also, through a reduction gearing 51, the torsion bar 43 is rotated in a direction to provide a restoring moment which opposes the moment resulting from the evacuated diaphragm's response to a pressure change. The restoring moment obtained by winding the torsion bar 43 returns the E-pick-off armature to its null position following any barometric pressure change which causes the diaphragm 42 to displace the armature. The tachometer generator 50 provides a signal representative of the actual rate of change of aircraft altitude $\dot{h}$, i.e. rate of descent, which is connected to an input terminal of the summing amplifier 45 in feedback fashion to stabilize the force balance servo loop. The $\dot{h}$ signal is also connected to an input terminal of an algebraic summation device 52. The other input terminal of the summation device 52 is connected to the $\dot{h}_{ref}$ potentiometer 40. The nominal rate of descent signal $\dot{h}_{ref}$ from the potentiometer 40 is applied in opposition to the actual rate of descent signal $\dot{h}$ from the tachometer generator signal 50 in order that the output signal from the summation device 52 is an error signal representative of the difference therebetween, i.e., $\dot{h}_{error}$.

Utilizing the present invention during the approach mode of operation, the $\dot{h}_{error}$ signal is rendered effective when the aircraft intercepts the center line of the glide slope beam and remains effective for a short predetermined time interval thereafter by means of the null sensor 11, the glide slope engage relay 12 and a time delay relay 53 in a manner to be explained. After this short predetermined time interval, the $\dot{h}_{error}$ signal is rendered ineffective and remains so during the remainder of the approach.

When the aircraft intercepts the center line of the glide slope beam and the null sensor 11 operates in response thereto, the glide path engage relay 12 engages to close its contact arms 12a, 12b and 12c as explained above. The glide path engage relay 12 is connected to the time delay relay 53 and at this time causes the relay 53 to position its contact arm 53a to its upper position as shown thereby connecting the output terminal of the summation device 52 to an input terminal of the summing amplifier 14 which renders the $\dot{h}_{error}$ signal effective. By this means, the deviations of the aircraft from the flight path angle or vertical speed commanded by the $\dot{h}_{ref}$ signal, which is represented by the $\dot{h}_{error}$ signal, are applied to the integrator 20. The integrated $\dot{h}_{error}$ signal from the integrator 20 is applied to the elevator servo system 34 to control the position of the elevator 36 thereby forming a closed loop flight path angle control system in which the flight path angle errors command a corrective pitch rate.

The effect of the $\dot{h}_{error}$ signal on the glide path engage trajectory can be appreciated by referring to FIG. 2. With the glide path displacement and integral of glide path displacement signals combined with the integral of the $\dot{h}_{error}$ signal, the integration of the $\dot{h}_{error}$ signal provides most of the required pitch down bias while the glide path error signal provides the additional corrections required to bring the aircraft to the center of the beam resulting in appreciably less overshoot as indicated by the dotted line of FIG. 2.

After a predetermined time interval during which the aircraft has captured the center line of the glide slope beam, the time delay relay 53 becomes deenergized causing its contact arm 53a to drop to its lower position thus disconnecting the output of the summing device 52 from the input terminal of the summing amplifier 14 thereby rendering the $\dot{h}_{error}$ signal ineffective. During the remainder of the approach, the aircraft is controlled in accordance with the radio displacement and the integral of the radio displacement signals.

It is advantageous to use a time delay relay 53 in order to overcome the problems associated with tolerance accumulations of the measurement of the $\dot{h}$ signal and variations in aircraft speed. This is best illustrated by reference to an example in which there is a 10% variation from the nominal approach speed. Assuming a nominal approach speed of 180 knots, a 10% increase in the approach speed results in an actual approach speed of 198 knots. If the $\dot{h}_{ref}$ signal is established on the basis of the nominal 180 knots, the resultant flight path angle commanded will be 10% less than the required 2½°, i.e., 2¼°. This ¼° error in descent angle is not significant in the beam capture trajectory phase but if this incorrect reference signal were permitted to remain as an input to the integrator 20 a beam stand-off would result. Since the $\dot{h}$ control loop is essentially an auxiliary flight path angle control used to improve the beam capture trajectory only, it need be applied during the beam capture only and not during the remainder of the approach. The beam capture maneuver required to establish the final descent angle should normally be completed within 10 seconds, even when the overall system gain is made sufficiently low to limit the maximum normal acceleration to below 0.1 $g$'s for the severest initial conditions. Thus, a time delay relay 53 having a ten second time delay which closes its contact arm 53a when the glide path engage relay 12 engages and which opens its contact arm 53a to render the $\dot{h}_{error}$ control loop ineffective 10 seconds after glide path interception has been found to be adequate in certain aircraft.

If greater accuracy is desired, the actual air speed of the aircraft during the approach can be measured by conventional air speed devices and a signal representative thereof used in lieu of the nominal approach speed signal V.

Referring now to FIG. 3, an alternative embodiment of the system of FIG. 1 is shown which is adjustable to compensate for vertical descent path systems having glide slope beam center lines at angles other than the conventional 2½° angle I.L.S. beams. This is to permit utilization of the present invention with systems which are presently under development and evaluation that provide automatic approach and landing capabilities along a variety of descent paths. The particular descent path desired is selected by the pilot by adjusting the knob 55 until the pointer 56 attached thereto is adjacent the graduation on the scale 57 which coincides with the desired descent angle. The knob 55 is connected to the slider 58 of a potentiometer 59 in order that an electrical signal representative of the desired descent path and approach speed is applied to the summation device 52 to provide the necessary variable $\dot{h}_{ref}$ signal.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In apparatus by means of which an aircraft may be controlled to capture a radio defined glide slope beam, means for generating a first signal representative of a rate of descent defined by the angle of said glide slope beam with respect to the earth and the speed of said aircraft, means for generating a second signal representative of the actual rate of descent of said aircraft, and means connected to receive said first and second signals for providing an output representative of the difference therebetween.

2. Apparatus of the character described in claim 1 further including means responsive to the position of the aircraft with respect to the center of said beam for rendering said output effective when said aircraft is at a predetermined position with respect to the center of the beam.

3. Apparatus of the character described in claim 2 in which said last-mentioned means further includes time delay means for maintaining said output signal effective for a predetermined time interval.

4. In apparatus by means of which an aircraft may be controlled to capture the center of a radio defined glide slope beam, means for generating a first signal representative of a rate of descent defined by the angle of said glide slope beam with respect to the earth and the speed of said aircraft, means for generating a second signal representative of the actual rate of descent of said aircraft, means responsive to the displacement of said aircraft from the center of said radio beam for providing a third signal representative thereof, algebraic summation means responsive to said first and second signals for providing an output representative of the difference therebetween and signal utilization means responsive to said third and difference signals for controlling said aircraft to approach and maintain the center of said radio beam.

5. In automatic approach apparatus by means of which an aircraft may be controlled to capture the center of a radio defined glide slope beam, means for generating a first signal representative of a nominal rate of descent defined by the angle of said glide slope beam with respect to the earth and the approach speed of said aircraft, means for generating a second signal representative of the actual rate of descent of said aircraft, algebraic summation means responsive to said first and second signals for providing a third signal representative of the difference therebetween, radio receiving means responsive to the displacement of said aircraft from the center of said radio beam for providing a fourth signal representative thereof, integrating means responsive to said third and fourth signals for providing a fifth signal representative of the integral thereof, and pitch servo means responsive to said third and fifth signals for controlling said aircraft to approach and maintain the center of said radio beam.

6. Apparatus of the character described in claim 5 including means for providing a sixth signal representative of the deviation of said aircraft from a predetermined pitch attitude, said servo means also being responsive to said sixth signal.

7. In automatic approach apparatus by means of which an aircraft may be controlled to capture the center of a radio defined glide slope beam, means for generating a first signal representative of a nominal rate of descent defined by the angle of said glide slope beam with respect to the earth and the approach speed of the aircraft, altimeter means for generating a second signal representative of the actual rate of descent of said aircraft, algebraic summation means responsive to said first and second signals for providing a third signal representative of the difference therebetween, radio receiving means responsive to the displacement of said aircraft from the center of said radio beam for providing a fourth signal representative thereof, means including time delay means responsive to said fourth signal for rendering said third signal effective for a predetermined time interval when said fourth signal reaches a predetermined magnitude, integrating means normally responsive to said fourth signal and during said predetermined time interval to said third signal for providing a fifth signal representative of the integral of the summation thereof, and pitch servo means responsive to said fourth and fifth signals for controlling said aircraft to approach and maintain the center of said radio beam.

8. Apparatus of the character described in claim 7 including means for providing a sixth signal representative of the deviation of said aircraft from a predetermined pitch attitude, said servo means also being responsive to said sixth signal.

9. Apparatus of the character described in claim 7 in which said means for generating a first signal includes means for varying that portion of the signal representative of the angle of the glide slope beam in accordance with the actual angle of said beam.

10. Automatic flight control apparatus by means of which an aircraft may be controlled to capture the center of a radio defined glide slope beam wherein said apparatus includes radio receiving means for providing a signal representative of the displacement of said aircraft from the center of said radio beam, integrating means responsive to said displacement signal, first algebraic summation means connected to be responsive to said displacement signal and said integrating means, and means including elevator servo means connected to said algebraic summation means for controlling the elevator in accordance with the signal therefrom comprising means for generating a signal representative of a nominal rate of descent defined by the angle of said glide slope beam with respect to the earth and the speed of said aircraft, means for generating a signal representative of the actual rate of descent of said aircraft, second algebraic summation means responsive to said nominal and actual rate of descent signals for providing a signal representative of the difference therebetween, said difference signal being normally ineffective, and means responsive to said displacement signal for connecting said second algebraic summation means to said integrating means for a predetermined time interval when the aircraft intercepts the center of the radio beam.

References Cited in the file of this patent

UNITED STATES PATENTS 2,830,291     Hecht _____ Apr. 8, 1958
2,996,271     Lindahl _____ Aug. 15, 1961